US006116765A

United States Patent [19]

Lin

[11] Patent Number: 6,116,765
[45] Date of Patent: Sep. 12, 2000

[54] AIR VENTING TUBE FOR AN AUTOMOBILE LAMP

[75] Inventor: Tung-Pang Lin, Tainan, Taiwan

[73] Assignee: TYC Brother Industrial Co., Ltd., Taiwan

[21] Appl. No.: 09/316,327

[22] Filed: May 21, 1999

[30] Foreign Application Priority Data

Jun. 5, 1998 [TW] Taiwan ................................ 87208904

[51] Int. Cl.$^{7}$ ...................................................... B60Q 1/00
[52] U.S. Cl. ............................................ 362/547; 362/294
[58] Field of Search .................................... 362/547, 294, 362/373

[56] References Cited

U.S. PATENT DOCUMENTS 5,010,453 4/1991 Ketterman .......................... 362/294 X
5,406,467 4/1995 Hashemi ................................ 362/294
6,042,255 3/2000 Kibayashi .............................. 362/547

*Primary Examiner*—Stephen Husar
*Attorney, Agent, or Firm*—Trop, Pruner & Hu, P.C.

[57] ABSTRACT

An air venting tube for use with an automobile lamp having a housing formed with an air outlet includes a tubular body, a connecting block and a cover plate. The tubular body has an open first end portion with a front section adapted to be mounted fittingly on the housing at the air outlet so as to be communicated fluidly with the air outlet. The tubular body further has a second end portion with an upper section that extends downwardly at an angle from a rear section of the first end portion, and a lower section having a distal end face with a first circumferential edge part and a second circumferential edge part that cooperatively define an opening. The connecting block is disposed outwardly of the tubular body, and has a planar first end wall with a periphery connected to the first circumferential edge part, and a planar second end wall opposite to the first end wall. The cover plate is formed on the second end wall of the connecting block, and extends in radial directions toward the second circumferential edge part. The cover plate has a size sufficient to cover the opening in the lower section, and is spaced apart from the distal end face by the connecting block to form a clearance with the second circumferential edge part of the distal end face.

7 Claims, 4 Drawing Sheets

AIR VENTING TUBE FOR AN AUTOMOBILE LAMP

BACKGROUND OF THE INVENTION

1. Field of the Invention

The invention relates to an air venting tube for an automobile lamp, more particular to an air venting tube which permits moisture and steam to escape from a housing of the automobile lamp, while effectively preventing entry of water into the housing of the lamp in order to prevent accumulation of water in the latter.

2. Description of the Related Art

When an automobile is disposed in a very humid environment for a period of time, moisture will enter into an interior of a housing of an automobile lamp of the automobile. When the automobile lamp is turned on, the moisture will turn into steam or fog, which results in a reduction in the brightness of the light output of the automobile lamp. As such, the conventional automobile lamp is generally provided with an air outlet in the housing thereof such that steam or moisture can escape from the housing to prevent a reduction in the brightness of the light output.

A plurality of quality tests are conducted for testing various properties of an automobile lamp after manufacturing the same. These tests include a spraying test through which the waterproofing effect of the automobile lamp is tested. The spraying test is performed by spraying the automobile lamp with a plurality of water jets in various directions for a period of time, and inspecting whether or not the automobile lamp has accumulated water within the housing thereof. It is noted that the aforementioned air outlet formed in the housing of the automobile lamp can permit water to enter into the interior of the housing of the automobile lamp during the spraying test. To solve this problem, an air venting tube has been proposed. The air venting tube is to be mounted on the housing at the air outlet to permit moisture and steam to escape from the housing of the automobile lamp, while preventing the entry of water into the housing of the lamp.

Referring to FIG. 1, a first conventional air venting tube 1 is shown to have an inverted L-shaped construction with a horizontal first section 11 and a vertical second section 12 which extends downwardly from the first section 11 generally at a right angle. The first section 11 is to be sleeved fittingly on a tubular air outlet 21 formed in a housing 20 of an automobile lamp 2. The second section 12 has an open lower end 121 with a bevel end face that is inclined with respect to a horizontal plane. However, the air venting tube 1 does not render the automobile lamp 2 to pass the spraying test since water can be guided directly upward via the open lower end 121 of the second section 12 and is allowed to enter the housing 20 of the lamp 2 through a vent hole 211 formed in the air outlet 21.

FIG. 2 illustrates a second conventional air venting tube 3 which is formed to have a U-shaped construction with a horizontal first section 32 to be sleeved fittingly on the tubular air outlet 21 in the housing 20 of the automobile lamp 2, a vertical second section 33 extending downwardly from the first section 32, and a horizontal third section 31 extending from the second section 33. However, it is found that the air venting tube 3 cannot effectively prevent entry of water into the interior of the housing 20 of the automobile lamp 2 through the air outlet 21 during the spraying test.

Although each of the aforesaid conventional air venting tubes 1, 3 is formed as a bent tubular body in order to block the water jets and prevent the entry of water into the housing 20 of the automobile lamp 2, the waterproofing effect achieved thereby is found to be unsatisfactory.

Referring to FIG. 3, a third conventional air venting tube 4 is shown to have a generally inverted L-shaped construction with a horizontal first section 43 to be sleeved fittingly on the tubular air outlet 21 in the housing 2 of the automobile lamp 2, and a vertical second section 44 which has an open lower end 42 with a bevel end face 421, similar to the first conventional air venting tube 1 shown in FIG. 1. An inclined cover plate 41 is formed in the lower end 42 and extends downwardly along the end face 421 from a circumferential edge part of the lower end 42 toward an axis of the second section 44. A blocking wall 45 is formed inside the second section 44, and extends from an inner wall surface of the second section 44. The blocking wall 45 is spaced apart vertically and is opposite to the cover plate 41, and inclines downwardly in a direction toward the axis of the second section 44. With the provision of the cover plate 41 and the blocking wall 45, the air venting tube 4 can achieve a better waterproofing effect in comparison with the conventional air venting tubes 1 and 3 shown in FIGS. 1 and 2.

Referring to FIGS. 3 and 4, during the manufacture of the air venting tube 4, an inner mold 40 with a shape corresponding to that of the interior of the air venting tube 4 is disposed within and is spaced apart from an outer mold 46. As shown, in order to form the cover plate 41 and the blocking wall 45, the inner mold 40 needs to be cut to form a first groove 401 and a second groove 402. Since each of the grooves 401, 402 extends radially into the inner mold 40 toward the axis of the inner mold 40, it is required that the grooves 401, 402 be spaced apart by a predetermined distance to prevent breakage of the inner mold 40. As such, in the air venting tube 4, a vertical distance (a) and a horizontal clearance (b) are defined between distal ends of the cover plate 41 and the blocking wall 45.

However, during the spraying test, it is found that the clearance (b) unavoidably permits entry of the water jets upward into the interior of the air venting tube 4. For example, when the spraying test is performed to test the waterproofing effect provided by the air venting tube 4 whose clearance (b) is 1 mm, with a water pressure of 3 kg and a spraying period of 2 hours, water was found to have accumulated in the housing 20 of the automobile lamp 2. The waterproofing effect provided by the air venting tube 4 is still unsatisfactory.

SUMMARY OF THE INVENTION

Therefore, the main object of the present invention is to provide an air venting tube which permits moisture and steam to escape from a housing of an automobile lamp, while preventing the entry of water into the housing to result in an excellent waterproofing effect.

Accordingly, the air venting tube of the present invention is to be used with an automobile lamp having a housing formed with an air outlet, and includes a tubular body, a connecting block and a cover plate. The tubular body has an open first end portion with a front section adapted to be mounted fittingly on the housing of the automobile lamp at the air outlet so as to be communicated fluidly with the air outlet, and a rear section. The tubular body further has a second end portion with an upper section that extends downwardly at an angle from the rear section of the first end portion, and a lower section having a distal end face with a first circumferential edge part and a second circumferential edge part that cooperatively define an opening. The connecting block is disposed outwardly of the tubular body, and has a planar first end wall with a periphery connected to the first circumferential edge part of the distal end face, and a planar second end wall opposite to the first end wall. The cover plate is formed on the second end wall of the connecting block, and extends in radial directions toward the second circumferential edge part of the distal end face. The cover plate has a size sufficient to cover the opening in the lower section, and is spaced apart from the distal end face by the connecting block to form a clearance with the second circumferential edge part of the distal end face.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
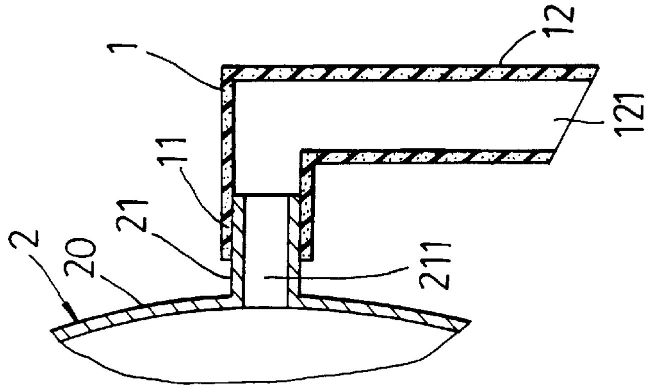
FIG. 1 PRIOR ART
FIG. 1 is a vertical sectional view illustrating a first conventional air venting tube when mounted on a housing of an automobile lamp.
Figure 2:
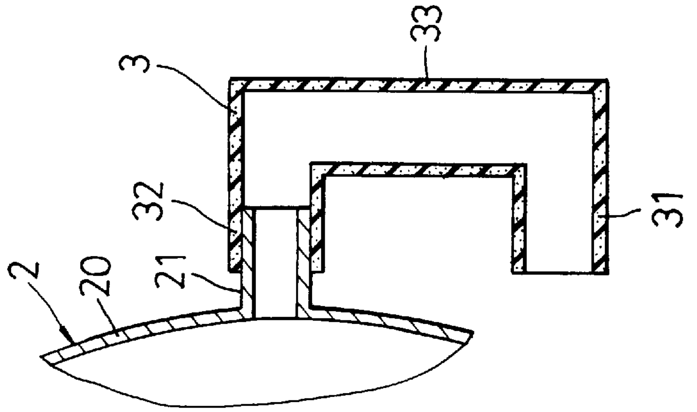
FIG. 2 PRIOR ART
FIG. 2 is a vertical sectional view illustrating a second conventional air venting tube when mounted on the housing of the automobile lamp.
Figure 3:
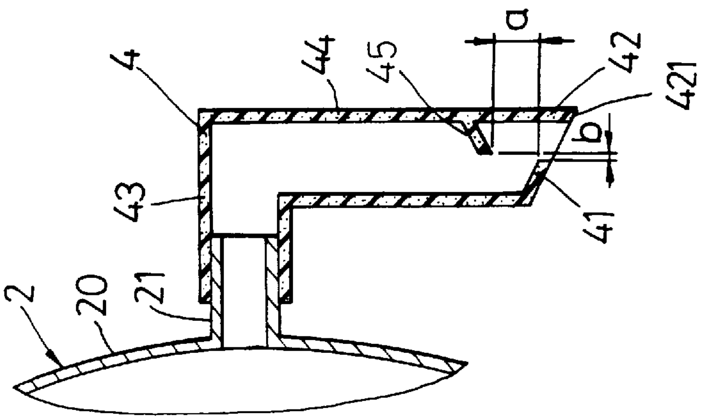
FIG. 3 PRIOR ART
FIG. 3 is a vertical sectional view illustrating a third conventional air venting tube when mounted on the housing of the automobile lamp.
Figure 4:
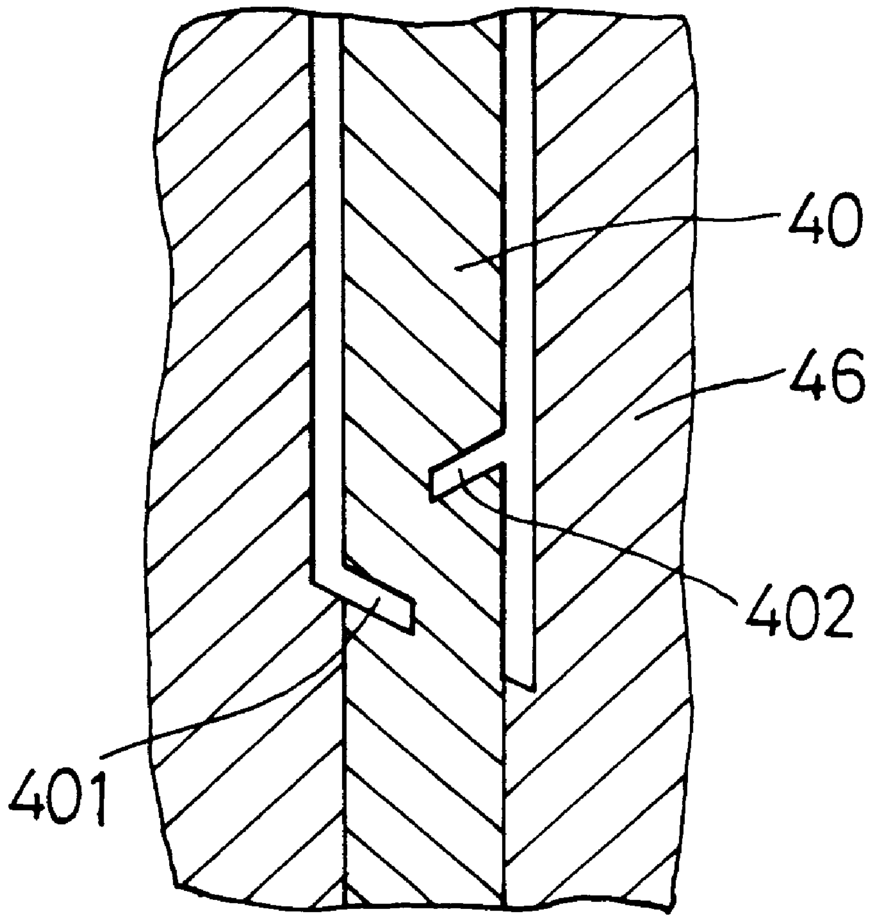
FIG. 4 PRIOR ART
FIG. 4 is a fragmentary sectional view illustrating a mold for forming the air venting tube of FIG. 3.
Figure 5:
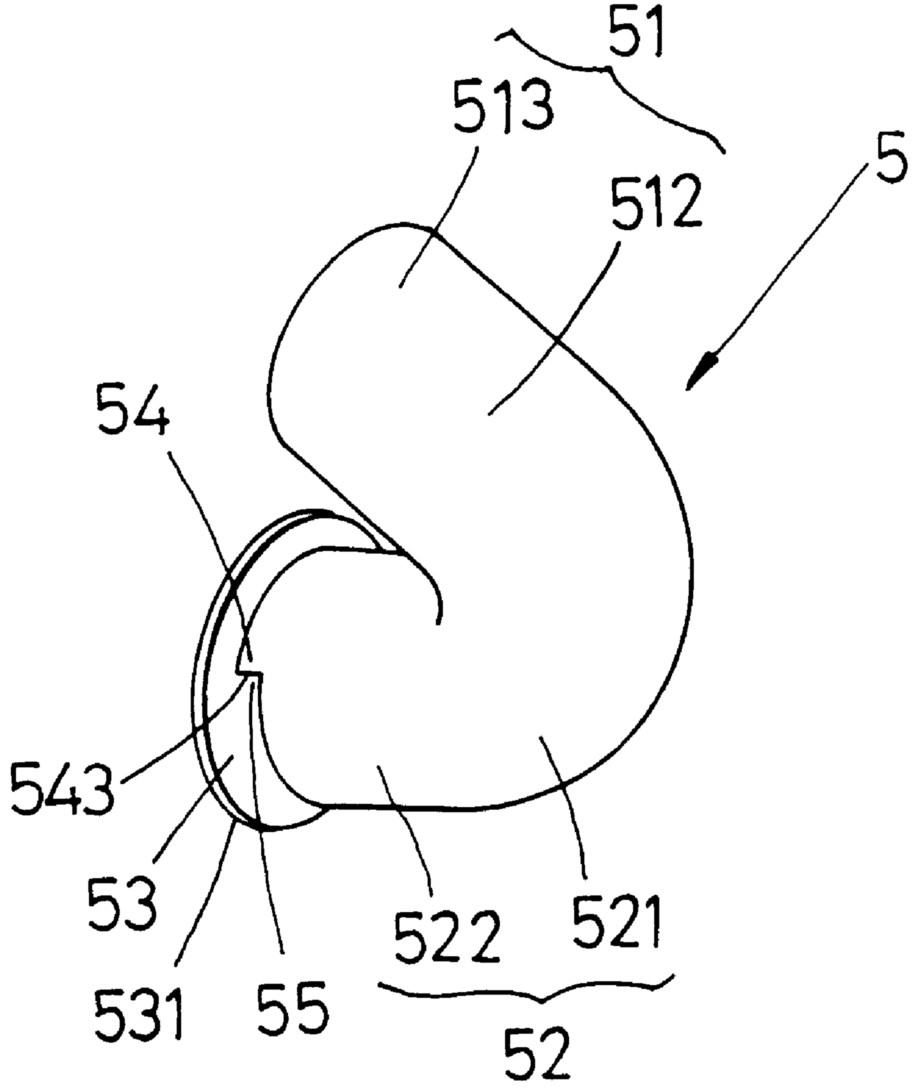
FIG. 5 is a perspective view of a first preferred embodiment of the air venting tube of the present invention.
Figure 6:
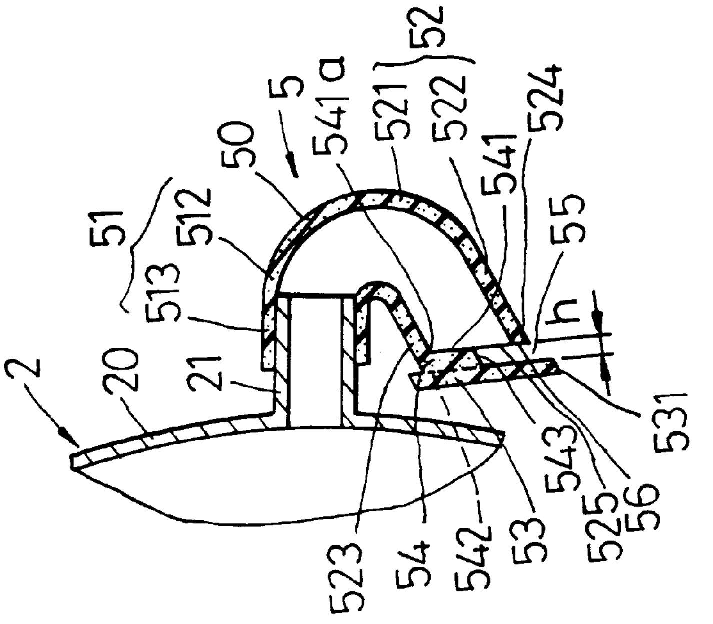
FIG. 6 is a vertical sectional view of the air venting tube of the first preferred embodiment when mounted on the housing of the automobile lamp.

Referring to FIGS. 5 and 6, the first preferred embodiment of the air venting tube 5 of the present invention is shown to be adapted for mounting on the housing 20 of the automobile lamp 2 at the tubular air outlet 21 of the housing 20.

The air venting tube 5 includes a tubular body 50, a connecting block 54 and a cover plate 53, which are formed integrally from a waterproof resilient material, such as rubber. The tubular body 50 has a generally V-shaped construction with a first end portion 51 and a second end portion 52. The first end portion 51 has a front section 513 which is sleeved fittingly on the tubular air outlet 21 of the housing 20. The second end portion 52 has an upper section 521 which extends downwardly at an angle from a rear section 512 of the first end portion 51, and a lower section 522 which extends forwardly toward the housing 50 of the automobile lamp 5 and which has a distal end face 56. The distal end face 56 has a first circumferential edge part 523 and a second circumferential edge part 524 that cooperatively define an opening 525.

The connecting block 54 is disposed outwardly of the tubular body 50 adjacent to the opening 525, and has a planar first end wall 541, and a planar second end wall 542 opposite to the first end wall 541. The first end wall 541 has a periphery 541*a* connected integrally to the first circumferential edge part 523 of the distal end face 56 of the second end portion 52 of the tubular body 50. The connecting block 54 has a size sufficient to cover one-half of the opening 525, and further has a third end wall 543 that faces downwardly.

The cover plate 53 is formed integrally on the second end wall 542 of the connecting block 54, and extends in radial directions toward the second circumferential edge part 524 of the distal end face 56 of the second end portion 52 of the tubular body 50. The cover plate 53 has a size sufficient to cover the opening 525, and is spaced apart from the distal end face 56 by the connecting block 54 to form a clearance (h) with the distal end face 56. Therefore, a radial slot 55 is formed between the cover plate 53 and the second end portion 52 of the tubular body 50. Moisture and steam that are present within the housing 20 of the automobile lamp 2 can thus escape from the housing 20 via the radial slot 55. The third end face 543 of the connecting block 54 faces the radial slot 55, and provides a blocking effect to block water jets and to prevent entry of water into an interior of the air venting tube 5. In the present embodiment, the cover plate 53 is larger than the opening 525, and has a lower periphery 531 which extends in the radial directions beyond the second circumferential edge part 524 of the distal end face 56.

No water was found to have accumulated in the housing 20 of the automobile lamp 2 that incorporates the air venting tube 5 whose clearance (h) between the cover plate 53 and the distal end face 56 is 2 mm, after the spraying test was conducted overnight. The waterproofing effect attained by the air venting tube 5 is satisfactory. In addition, the connecting block 54 imparts an enhanced rigidity to the cover plate 53 to prevent the cover plate 53 from being uncovered by the water jets during the spraying test.

Since the cover plate 53 has a size sufficient to cover the opening 525, only a small amount of water is permitted to enter into the air venting tube 5 via the radial slot 55. However, a large portion of the water that passes through the radial slot 55 is blocked by the third end wall 543 of the connecting block 54 that faces the radial slot 55. An excellent waterproofing effect can thus be attained.

In addition, the inner mold used for forming the air venting tube 5 during the injection molding process needs not to be formed with grooves that might render the inner mold susceptible to breakage.

Figure 7:
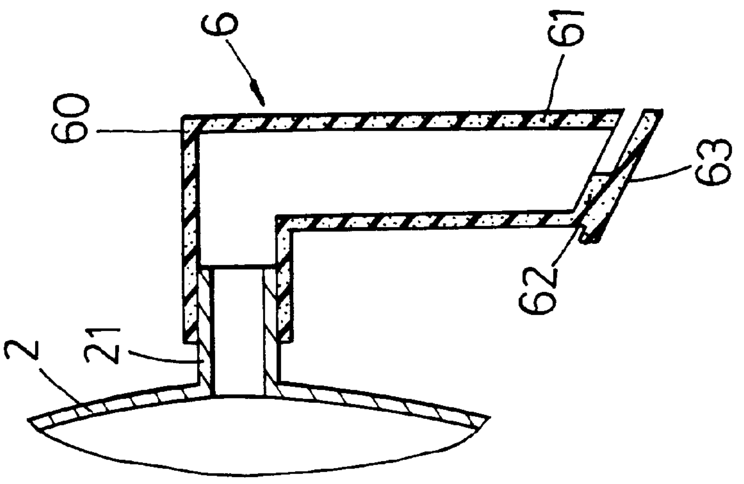
FIG. 7 is a vertical sectional view of a second preferred embodiment of the present invention when mounted on the housing of the automobile lamp.

Referring to FIG. 7, a second preferred embodiment of the air venting tube 6 of the present invention is shown to also include a tubular body 60, a connecting block 62 and a cover plate 63. The structure of the air venting tube 6 is similar to that of the air venting tube 5 shown in FIG. 6, except that the tubular body 60 has an inverted L-shaped construction. The air venting tube 6 also provides the automobile lamp 2 with an enhanced waterproofing capability.

It has thus been shown that the air venting tube 5, 6 of the present invention permits moisture and steam to escape from the housing 20 of the automobile lamp 2, while preventing the entry of water into the housing 20 in a relatively efficient manner. Therefore, the automobile lamp 2 which incorporates the air venting tube 5, 6 of the present invention is capable of passing the spraying test for inspecting the waterproofing effect of the lamp 2.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An air venting tube adapted for use with an automobile lamp having a housing formed with an air outlet, comprising:

a tubular body having an open first end portion with a front section adapted to be mounted fittingly on the housing of the automobile lamp at the air outlet so as to be communicated fluidly with the air outlet, and a rear section, said tubular body further having a second to end portion with an upper section that extends downwardly at an angle from said rear section of said first end portion, and a lower section having a distal end face with a first circumferential edge part and a second circumferential edge part that cooperatively define an opening;

a connecting block disposed outwardly of said tubular body and having a planar first end wall with a periphery connected to said first circumferential edge part of said distal end face, and a planar second end wall opposite to said first end wall; and a cover plate formed on said second end wall of said connecting block and extending in radial directions toward said second circumferential edge part of said distal end face, said cover plate having a size sufficient to cover said opening in said lower section and being spaced apart from said distal end face by said connecting block to form a clearance with said second circumferential edge part of said distal end face.

2. The air venting tube according to claim 1, wherein said connecting block has a size sufficient to cover one-half of said opening in said lower section.

3. The air venting tube according to claim 1, wherein said tubular body, said connecting block and said cover plate are formed integrally from a waterproof material.

4. The air venting tube according to claim 1, wherein said tubular body, said connecting block and said cover plate are formed integrally from a resilient material.

5. The air venting tube according to claim 4, wherein the resilient material is rubber.

6. The air venting tube according to claim 1, wherein said cover plate is larger than said opening in said lower section.

7. The air venting tube according to claim 6, wherein said cover plate has a periphery that extends in the radial directions beyond said second circumferential edge part of said distal end face.

* * * * *